Oct. 7, 1958     L. A. JOYCE     2,855,210
UTILITY CART
Filed April 3, 1956

Lawrence A. Joyce
INVENTOR.

BY *Lawrence A. O'Brien*
*and Harvey B. Jacobson*
Attorneys

United States Patent Office 2,855,210
Patented Oct. 7, 1958

2,855,210

UTILITY CART

Lawrence A. Joyce, Minot, N. Dak.

Application April 3, 1956, Serial No. 575,898

2 Claims. (Cl. 280—47.19)

The present invention relates to certain new and useful improvements in a utility cart, that is, a handle-equipped wheel and leg supported frame structure which is expressly but not necessarily, designed and adapted to accommodatingly support and transport household-type containers, for example, cans used for garbage, ashes, refuse and the like.

Many and varied styles and forms of racks, barricading frameworks and the like have been offered for use in connection with garbage cans and the like. Looking toward a more complete and desirable solution of the over-all problem, it is an object of the instant invention to structurally, functionally and otherwise improve upon similarly constructed and performing can holding and protecting devices. To this end, a construction is provided which, it is believed, better fulfills the requirements of manufacturers, will appeal to and be endorsed by retailers, and will fulfill the needs of the average home owner or equivalent resident.

More particularly, the invention has to do with a wheel-equipped, easy-to-handle openwork frame construction which, when it is stationary, provides a rack, and which may be then utilized as a cart for handily transporting the cans, especially when they are heavily loaded, from place to place.

Cans in the category under consideration are used for general yard cleanup and other purposes and are often loaded too heavily with trash and debris and if they are of the larger sizes, they are unwieldy and sometimes dangerous to handle. It is therefore an object of the invention to permit loaded cans to be easily carted from place to place in a manner to relieve users of undue physical effort and strain.

Other objects, features and advantages will become more readily apparent from the following description and the accompanying sheet of illustrative drawings.

In the drawings, wherein like numerals are employed to designate like parts throughout the views.

Briefly summarized the preferred embodiment of the cart is that which, as disclosed, is characterized by a wheel supported openwork lightweight frame structure. The latter is characterized, as is evident, by upper and lower generally ovate frame members which are similar in size and are of endless form. These frame members are arranged in spaced apart parallelism and they are connected by forward and rearward uprights or equivalent vertical members the lower ends of which depend below the plane of the lower frame member. In addition there is an elongated U-shaped member provided and this may be treated as having a bight portion connecting adjacent corresponding ends of the elongated linearly straight arms. The arms in turn are diagonally disposed and have portions at longitudinally spaced points connected with the rearward end portion of the upper frame member and forward end portion of the lower frame member respectively. Additional braces are included along with an axle and supporting wheel construction all of which parts will be brought out more explicitly in the following description of the details.

Figure 1:
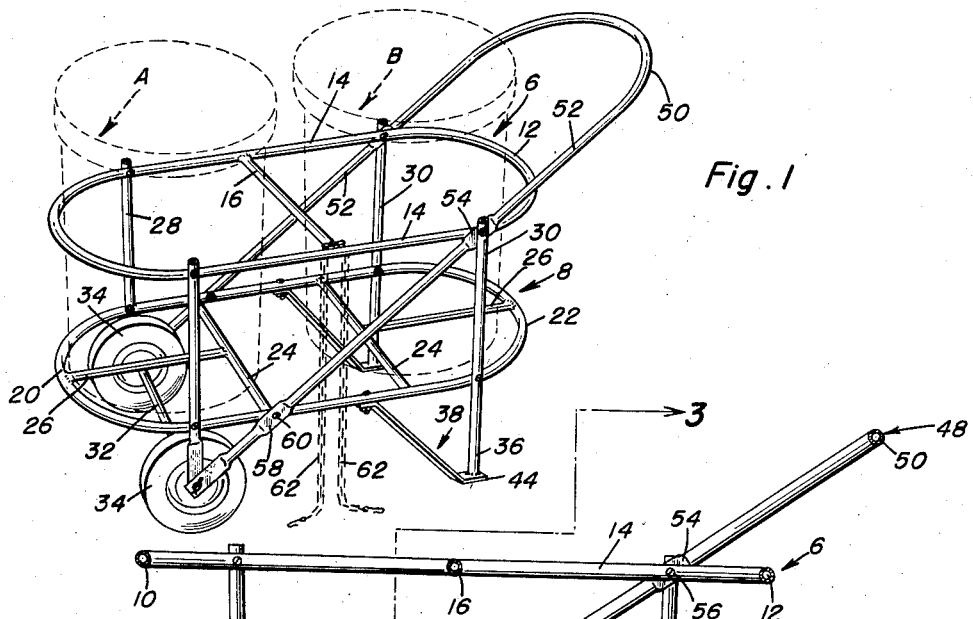
Figure 1 is a perspective view of a rack and cart constructed in accordance with the invention and showing the manner in which the same may be used.
Figure 2:
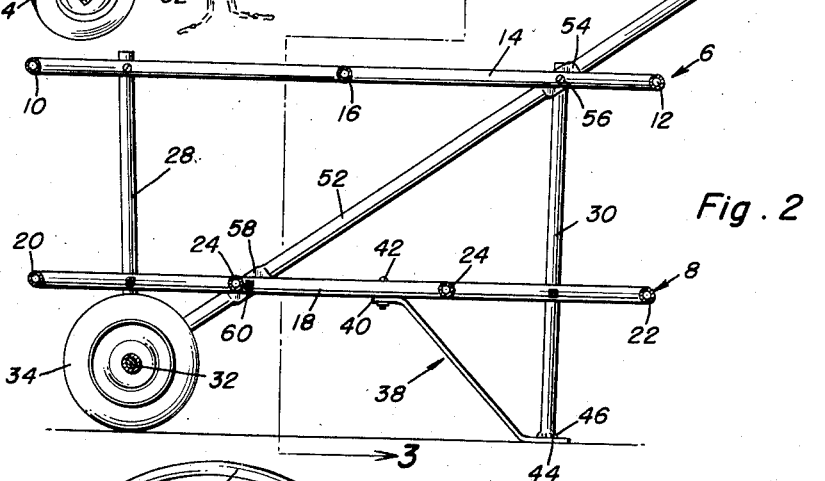
Figure 2 is a view on a slightly enlarged scale which may be said to be taken centrally through the construction seen in Figure 1; and, Figure 3 is a vertical section on the line 3—3 of Figure 2 looking in the direction of the arrows.
Figure 3:
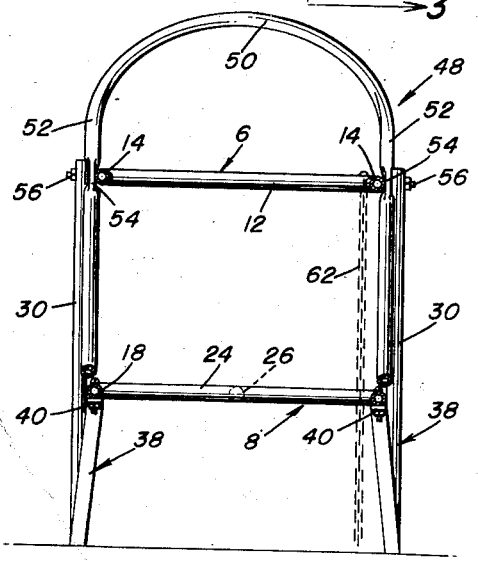

Referring now to the drawing, it will be seen that the openwork frame structure which is utilized as the portable rack is preferably made from rod or tube stock sometimes referred to as pipes. The material should be lightweight steel preferably so that it is not only light but strong and durable. The principal frame members may be referred to as upper and lower horizontal frames and these are denoted by the numerals 6 and 8 and are of general ovate form in plan, the curvate end portions of the frame 6 being denoted at 10 and 12 and the spaced parallel linearly straight side portions by the numerals 14. The centrally disposed cross member 16 provides a brace for the side members 14. The lower frame 8 is simlarly provided with spaced parallel longitudinal side members 18 connected by curvate end or bight portions 20 and 22. The braces here are T-shaped and they are arranged at the opposite end portions and one T at the left, for example, in Fig. 1 comprises a horizontal cross member or head 24 and a lengthwise centrally disposed stem 26. The parts of both members are denoted by the same numerals and they obviously cooperate with the frame in providing rests for the garbage or equivalent cans A and B. The brace 16 is disposed above the space existing between the T-shaped braces so that the respective frames are halves and each half portion serves to rack and properly barricade each of the cans in a well supported and reliable manner. The uprights are properly paired and are all denoted by the numerals 28 and 30, respectively. The uprights or posts 28 have their lower ends connected by an axle 32 which accommodatingly supports the ground engaging and carting wheels or rollers 34. The uprights or posts 30 have their lower ends 36 provided with suitable feet which are coplanar with the lower peripheral portions of the respective wheels. Diagonal braces 38 are provided and have their upper terminal ends 40 bolted at 42 to the side members 18 between the spaced apart cross-heads 24. The lower or forward ends of these braces are horizontally bent at 44 and underlie the lower ends of the legs and are welded thereto at 46 (see Fig. 2) so that they serve as ground engaging rests or feet.

The handle 48 is of elongated U-shaped form and comprises a bight portion 50 which provides the handle proper and a pair of spaced parallel arms 52. These arms have their portions embracing the frames and connected thereto. For example, the intermediate flattened portions 54 are bolted in place at 56. The lower end portions are also flattened as at 58 and they are bolted at 60 to the side members of the lower frame 8. Thus, the arms of the handle serve as rigidifying members.

It will be evident from this description that the expedients are carefully chosen for expeditious manufacture and assembling. The parts are also capable of being replaced and repaired. The over-all cart provides a rack when it is still on the ground or other supporting surface. it provides a cart when the legs and feet are lifted up and the handle is used to push the cart from place to place. Thus, in effect, it is a portable rack partitioned to handle the cans in a satisfactorily barricaded and protected manner. The chains 62 may be employed if desired to assist in keeping the lids of the cans (not detailed) in place.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A cart rack for trash cans comprising a lower horizontally disposed endless frame member generally ovate in plan and provided at one side of its transverse center with a first coplanar T-shaped brace, a second T-shaped brace mounted within the confines of said frame member on the other side of the transverse center, said braces functioning to assist in reliably supporting individual trash cans, an upper horizontally disposed endless frame member also ovate in plan and cooperatively arranged in spaced parallelism directly above said lower frame member and provided at a median portion thereof with a transverse brace located directly above the space existing between the respective T-shaped braces, a pair of front uprights attached at their upper ends to a forward end portion of the upper frame member and connected at their lower end portions to a corresponding forward portion of the lower frame member and depending below said frame member and being provided with an axle operatively supporting transporting wheels, a rear pair of uprights connected to the respective rearward end portions of the upper and lower frame members and depending below the plane of the lower frame, a pair of diagonal braces connected at corresponding ends with the respective side members of the lower frame member and having rearward end portions underlying and connected to the lower ends of the legs and providing sink-resisting-feet for said legs, and a U-shaped handle having arms straddling and rigidly connected with forward and rearward end portions respectively of said lower and upper frame members, the lower forward end portions of said arms being connected with the respective lower end portions of the aforementioned uprights.

2. A can rack and cart comprising a horizontally disposed endless lower frame member, a correspondingly horizontal endless upper frame member, said frame members being ovate in plan and arranged one above the other and being disposed in spaced apart parallelism, a plurality of uprights secured to the upper and lower frame members and providing an openwork frame structure, an elongated U-shaped member having a bight portion and spaced parallel linearly straight coplanar arms connected at corresponding ends by way of said bight portion, median portions of said arms being fixedly joined to cooperating side portions of said upper frame member forwardly of the rear end portion of said upper frame member, lower portions of said arms straddling and being fixedly joined to cooperating side portions of the lower frame member rearwardly of the forward end portion of said lower frame member and then depending below the plane of said lower frame member, said bight portion and portions of the arms which are located between the bight portion and plane of said upper frame member cooperating in providing push-pull handle means, an axle situated beneath the forward portion of the lower frame member and supported between the extending lower ends of said arms, wheels mounted on the end portions of said axle, a cross brace fixedly mounted between the intermediate portions of the side members of the upper frame member and dividing said upper frame member into forward and rearward areal portions, and T-shaped braces mounted within the confines of the lower frame member, one T-shaped brace underlying said forward areal portion and the other T-shaped brace underlying said rearward areal portion and said braces providing distinguishable rests for trash cans or the like.

References Cited in the file of this patent

UNITED STATES PATENTS

| | | |
|---|---|---|
| D. 118,060 | Smith | Dec. 12, 1939 |
| D. 150,475 | Swenson | Aug. 3, 1948 |
| 1,080,578 | Peppe | Dec. 9, 1913 |
| 1,176,978 | Parker | Mar. 28, 1916 |
| 1,831,026 | Nessan | Nov. 10, 1931 |
| 2,131,673 | Robinson | Sept. 27, 1938 |

FOREIGN PATENTS

| | | |
|---|---|---|
| 821,909 | France | Sept. 6, 1937 |
| 423,252 | Italy | July 10, 1947 |